Dec. 5, 1933. L. F. JULIEN 1,938,429
METAL FRAME FOR SCREENS
Original Filed April 15, 1931
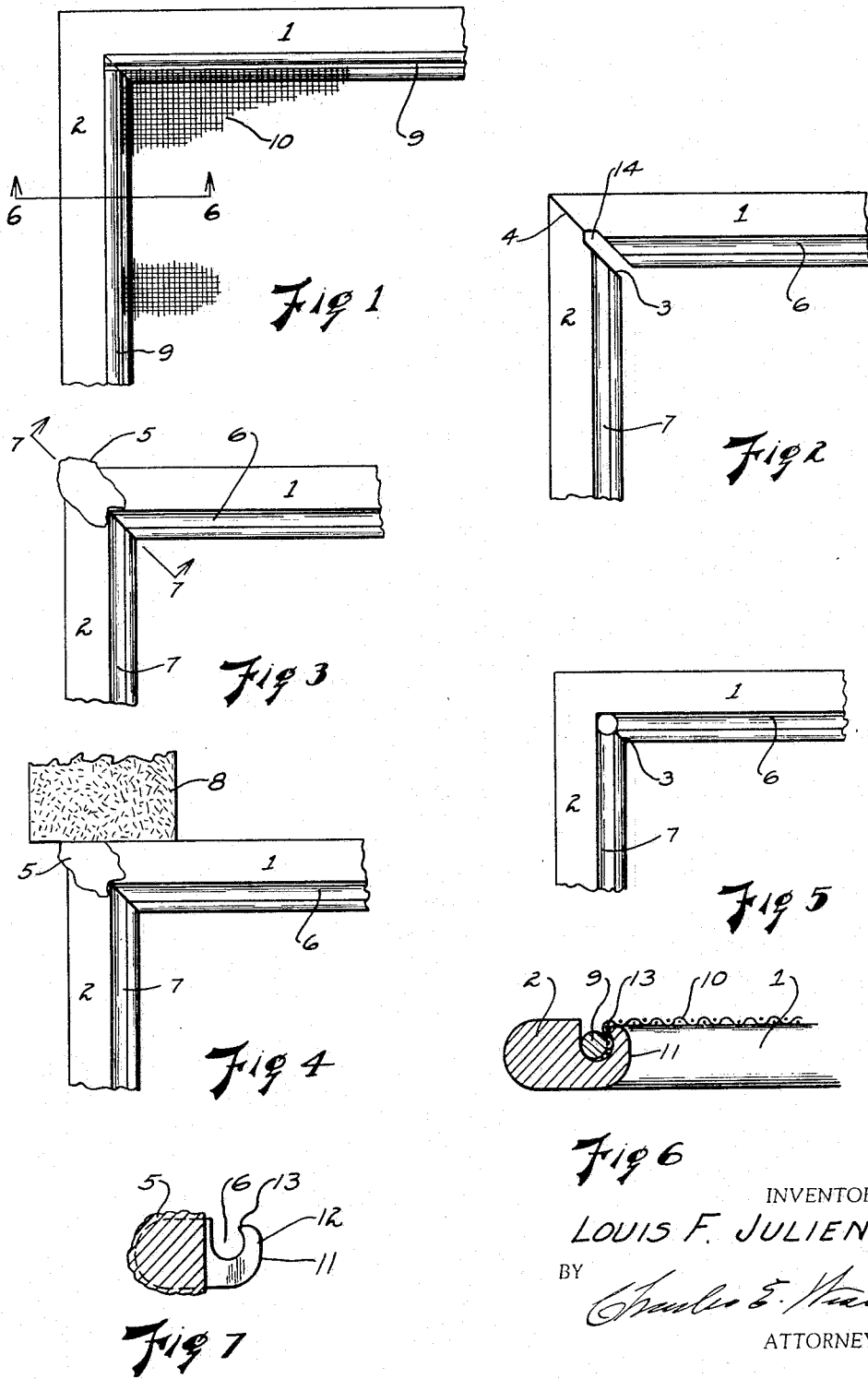

Patented Dec. 5, 1933

1,938,429

UNITED STATES PATENT OFFICE 1,938,429

METAL FRAME FOR SCREENS

Louis F. Julien, Detroit, Mich., assignor to Chamberlin Metal Weather Strip Company, Detroit, Mich., a corporation of Michigan Original application April 15, 1931, Serial No. 530,331. Divided and this application June 24, 1932. Serial No. 619,031

4 Claims. (Cl. 156—14)

This invention relates to steel or iron frames for window screens and the like and is a division of my application Serial No. 530,331, filed April 15, 1931.

The object of the invention is to provide a screen frame having a groove to receive a screen retaining strip or rod, the frame being originally so formed as to permit welding at the corners without the groove for the rod becoming filled with the melted iron and flux.

Heretofore, in the attempt to manufacture screen frames of iron or steel with which the cross and side members are welded at the corner, the extruded molten metal and flux lying in the groove is practically impossible to remove even with a cutting tool without marring and/or deforming the frame.

By my improved method of construction of the frame the weld at the corner is confined to the portion thereof extending from the groove outwardly and, as is hereinafter more fully described, the extruded material is confined to that portion of the corner not occupied by the groove.

A further feature and object of the invention is to provide a steel or iron frame provided with a groove produced by the forming rolls thus avoiding the expense of cutting the groove in the metal of the frame subsequent to rolling the bar forming the same.

These and other objects and novel features of the invention are hereinafter more fully described and claimed, and the preferred form of construction of a metal frame embodying my invention is shown in the accompanying drawing in which—

Fig. 1 is an elevation of one corner of the finished screen frame.

Fig. 2 is an elevation showing a portion of a cross and side member or stile of the frame showing its form prior to the welding operation.

Fig. 3 is a view illustrative of the two members subsequent to the welding.

Fig. 4 is an elevation showing a grinding wheel applied to the welded frame to remove the extruded metal.

Fig. 5 is an elevation showing a corner of the finished frame subsequent to the grinding operation.

Fig. 6 is a section taken on line 6—6 of Fig. 1 showing the bars, the screen and the retaining rod therefor.

Fig. 7 is a cross section taken on line 7—7 of Fig. 3.

One of the principal features of the invention is shown in Fig. 2. The mitered ends of the bars 1 and 2 are offset or stepped, the grooved portion thereof being offset as at 3 relative to the meeting line 4 between the two members. Thus, the portions 4 of each of the frames originally are slightly longer than in the finished frame. In securing these parts together a flux is applied to the two contacting surfaces 4 and the bars are placed under pressure while heated at the corners whereby the members 1 and 2 are forced together until the surfaces 3 at the end of the bars 1 and 2 come to contact as in Fig. 3.

The extruded material illustrated diagrammatically at 5 lies over the side face and edges of the frame but the surface 3 of the two frames, which come to meeting relationship as shown in Fig. 3, having been unprovided with a flux and not placed under pressure, does not cause metal to be extruded into the groove 6 with which the frames are provided. It is to be noted that the surface 3 of each bar extends beyond the groove thus providing a notch 14 shown in Fig. 3 in which extruded material may accumulate without cutting the groove. Subsequent to the welding operation the corners of the frames are submitted to a grinding operation as by a grinding wheel indicated at 8 in Fig. 4 and the surfaces of the frames are ground to provide a surface in continuity with the original surface of the bars resulting in the construction as shown in Fig. 5 with no apparent ine between the bars as is indicated at 4 in Fig. 2. Thus the trouble arising in previous methods of welding metal bars is avoided in that the extruded metal does not flow into the groove provided for the retaining rod for the screen.

The groove 6 may be formed in any approved manner and so shaped that the throat of the groove, as will be understood from Fig. 7, is slightly less in width than the diameter of the rod 9 to be positioned thereinto. The rod is inserted over the edge of the screen 10 as will be understood from Fig. 6 and, due to the form of the groove the rod is retained in place by the spring of the metal which is comparatively thin between the bottom of the groove and the inner side 11 of the bar.

This groove may also be formed by a rolling process in the formation of the bar, it first being formed of a width of the throat equal to the diameter of the recess and the edge portion 12 finally, during the period when the metal is sufficiently soft for the purpose, is slightly rolled inwardly by complementally formed rolls to form a point 13 whose distance from the opposite side of the groove is less than the width thereof below the throat. By rolling the groove in the bar after the manner stated, considerable expense is avoided in comparison to the cutting of the groove.

The frame thus may be welded at the corners in a manner to avoid extrusion of metal into the groove of the frame thus making it possible to provide an iron or steel framed screen for various uses particularly for windows of houses or other buildings. Previously, frames for this purpose have been made of sheet metal but sheet metal frames are unsatisfactory in many respects and disintegrate from rust etc., whereas with a solid bar here shown which can be rust-proofed and lacquered, a frame is provided that is of great strength and will last as long as the building without deterioration from natural causes. By rolling the groove in the manner stated, the expense of manufacture is materially reduced over either a sheet metal frame or a solid metal frame in which a groove may be formed by a cutting operation as the bar when it comes from the rolls is complete and only requires to be cut in stepped form at the ends to the desired length for use.

Having thus briefly described my invention, what I claim and desire to secure by Letters Patent of the United States is—

1. A frame comprising a series of metal bars joined at their end portions, said bars each having a longitudinal groove adjacent the inner edge and opening through the ends thereof, said bars being welded at the joined ends throughout a surface extending from the outer face of the base toward and terminating short of the grooves thus providing an unwelded portion of greater width than the groove.

2. A screen frame comprising metal bars mitered at the ends to form a frame of the desired shape, said bars each having a longitudinal groove adjacent the inner edge of the assembled bars and extending through the mitered ends to register with the grooves of the adjacent bars, said bars at the miter being welded for a portion of the joined ends to leave an unwelded portion at the joined ends of the grooves.

3. A frame comprising a series of metal bars, the ends of which are cut at an angle of forty-five degrees to the longitudinal edge portions thereof, each of said bars having a longitudinal groove adjacent the inner edge and opening through each end thereof and in registration with the grooves of the bars joined thereto, said bars being welded together at the joined ends from the outer edge toward the inner edge terminating short of the grooves thereby providing an unwelded end surface at the contacting end surfaces each side of the grooves, and a metal screen fabric having its respective edges secured in said grooves.

4. A screen frame comprising a series of metal bars having the ends mitered and welded together for a portion of the joint extending inwardly from the outer edge, said bars having a longitudinal groove opening through the ends, a metal screen fabric extending across the frames having the edges thereof extending into the grooves of the bars, and a metal rod forced into the groove of each bar to bind the respective screen edges therein and thereby placing the unwelded portions of the joints under tension and tending to hold the screen fabric taut.

LOUIS F. JULIEN.